United States Patent
Takahashi (10) Patent No.: US 10,518,623 B2
(45) Date of Patent: Dec. 31, 2019

(54) DYNAMIC DAMPER MOUNTING STRUCTURE

(71) Applicant: HONDA MOTOR CO., LTD., Tokyo (JP)

(72) Inventor: Toshiya Takahashi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 103 days.

(21) Appl. No.: 15/867,300

(22) Filed: Jan. 10, 2018

(65) Prior Publication Data

US 2018/0201112 A1    Jul. 19, 2018

(30) Foreign Application Priority Data

Jan. 19, 2017    (JP) .................... 2017-007647

(51) Int. Cl.
*B60K 5/12*    (2006.01)
*F16F 7/108*    (2006.01)

(52) U.S. Cl.
CPC .......... *B60K 5/1208* (2013.01); *B60K 5/1216* (2013.01); *F16F 7/108* (2013.01); *F16F 2230/0005* (2013.01)

(58) Field of Classification Search
CPC .. B60K 5/1208; B60K 5/1216; B60K 5/1225; B60K 5/1266; B62D 21/11; B62D 21/17; F16F 7/108; F16F 7/112; F16F 2230/0005
See application file for complete search history.

(56) References Cited

U.S. PATENT DOCUMENTS

| 4,858,879 | A  | * | 8/1989 | Miyamoto | ........... B60K 5/1233 267/140.13 |
| 4,997,169 | A  | * | 3/1991 | Nakamura | .............. F16F 13/10 267/140.13 |
| 7,128,311 | B2 | * | 10/2006 | Goto | ..................... F16F 13/264 267/140.14 |
| 7,350,777 | B2 | * | 4/2008 | Ogawa | ..................... F16F 1/54 267/140.4 |
| 7,562,737 | B2 | * | 7/2009 | Miyahara | ................. B60K 5/04 180/291 |
| 8,011,644 | B2 | * | 9/2011 | Saito | ..................... F16F 13/105 267/140.13 |

(Continued)

FOREIGN PATENT DOCUMENTS

| JP | H06-241278 A | 8/1994 |
| JP | H07-018048 U | 3/1995 |

(Continued)

OTHER PUBLICATIONS

Japanese Office Action with English Translation dated Aug. 21, 2018, 7 pages.

*Primary Examiner* — Laura Freedman
(74) *Attorney, Agent, or Firm* — Rankin, Hill & Clark LLP (57) ABSTRACT

A mounting structure for mounting a dynamic damper on a vehicle body frame of a vehicle includes a dynamic damper mounted on a vehicle body frame of a vehicle includes a dynamic damper bracket connecting the dynamic damper to the vehicle frame; a collar member rigidly fixed to the vehicle body frame; a mounting bracket which is mounted above the vehicle body frame, and which is elastically connected to the collar member; and a fixing member which fixes the dynamic damper bracket and the collar member to the vehicle body frame.

8 Claims, 10 Drawing Sheets

(56) References Cited

U.S. PATENT DOCUMENTS

| | | | | |
|---|---|---|---|---|
| 9,365,101 | B2* | 6/2016 | Okumura | F16F 13/106 |
| 9,610,979 | B2* | 4/2017 | Hirano | B62D 21/11 |
| 9,623,909 | B1* | 4/2017 | Hirano | B62D 21/11 |
| 10,046,634 | B2* | 8/2018 | Takahashi | B60K 5/1208 |
| 2016/0207569 | A1* | 7/2016 | Iwamoto | B62D 21/11 |
| 2018/0201111 | A1* | 7/2018 | Takahashi | B60K 5/1216 |

FOREIGN PATENT DOCUMENTS

| | | | |
|---|---|---|---|
| JP | H07-151184 | A | 6/1995 |
| JP | H09-263143 | A | 10/1997 |
| JP | 10169713 | A * | 6/1998 |
| JP | 10181648 | A * | 7/1998 |
| JP | 2002174289 | A * | 6/2002 |
| JP | 2010054032 | A * | 3/2010 |
| JP | 2012117561 | A * | 6/2012 |

* cited by examiner

FIG.7A
Comparative Example

DYNAMIC DAMPER MOUNTING STRUCTURE

CROSS REFERENCE TO RELATED APPLICATION

The present application is based on Japanese application JP 2017-007647 filed on Jan. 19, 2017, the content of which is hereby incorporated by reference into this application.

BACKGROUND OF THE INVENTION

1. Field of the Invention

The present invention relates to a dynamic damper mounting structure in which a dynamic damper is connected to a vehicle body frame through a dynamic damper bracket.

2. Description of the Related Art

JP H09-263143 A disclosed a mounting structure of a dynamic damper in which the dynamic damper is fastened with a bolt extending in one of lateral sides of an engine mount. In this mounting structure disclosed in JP H09-263143 A, the dynamic damper is fastened together with the body-side bracket.

SUMMARY OF THE INVENTION

An aspect of the present invention provides a mounting structure for mounting a dynamic damper on a vehicle body frame of a vehicle includes a dynamic damper mounted on a vehicle body frame of a vehicle includes a dynamic damper bracket connecting the dynamic damper to the vehicle frame; a collar member rigidly fixed to the vehicle body frame; a mounting bracket which is mounted above the vehicle body frame, and which is elastically connected to the collar member; and a fixing member which fixes the dynamic damper bracket and the collar member to the vehicle body frame.

DETAILED DESCRIPTION OF THE INVENTION

Prior to describing an embodiment of the present invention, the above-mentioned related art is further argued below.

The dynamic damper mounting structure disclosed by JP H09-263143 A was configured to be asymmetrical in left-right direction in the plan view of the sub-frame because the dynamic damper is arranged on one lateral side of the engine mount. Accordingly, the dynamic damper may generate unstable vibrations by vibrations inputted from a side of the engine thereto.

Further, in the dynamic damper mounting structure disclosed in JP H09-263143 A, the bolt for fasting the engine mount, the dynamic damper and the vehicle body side bracket together is fastened in a direction orthogonal with an input direction of the vibrations from the engine side. Accordingly, there may be an excessive force (vibrations) inputted from a direction orthogonal with an axial direction of the bolt.

The present invention is developed to provide a dynamic damper in an arrangement for stableness relative to the vehicle body frame.

The present invention provides a dynamic damper mounting structure with an arrangement of the dynamic damper for stable operation.

Next, embodiments of the present invention will be described with reference to drawings.

Figure 1:
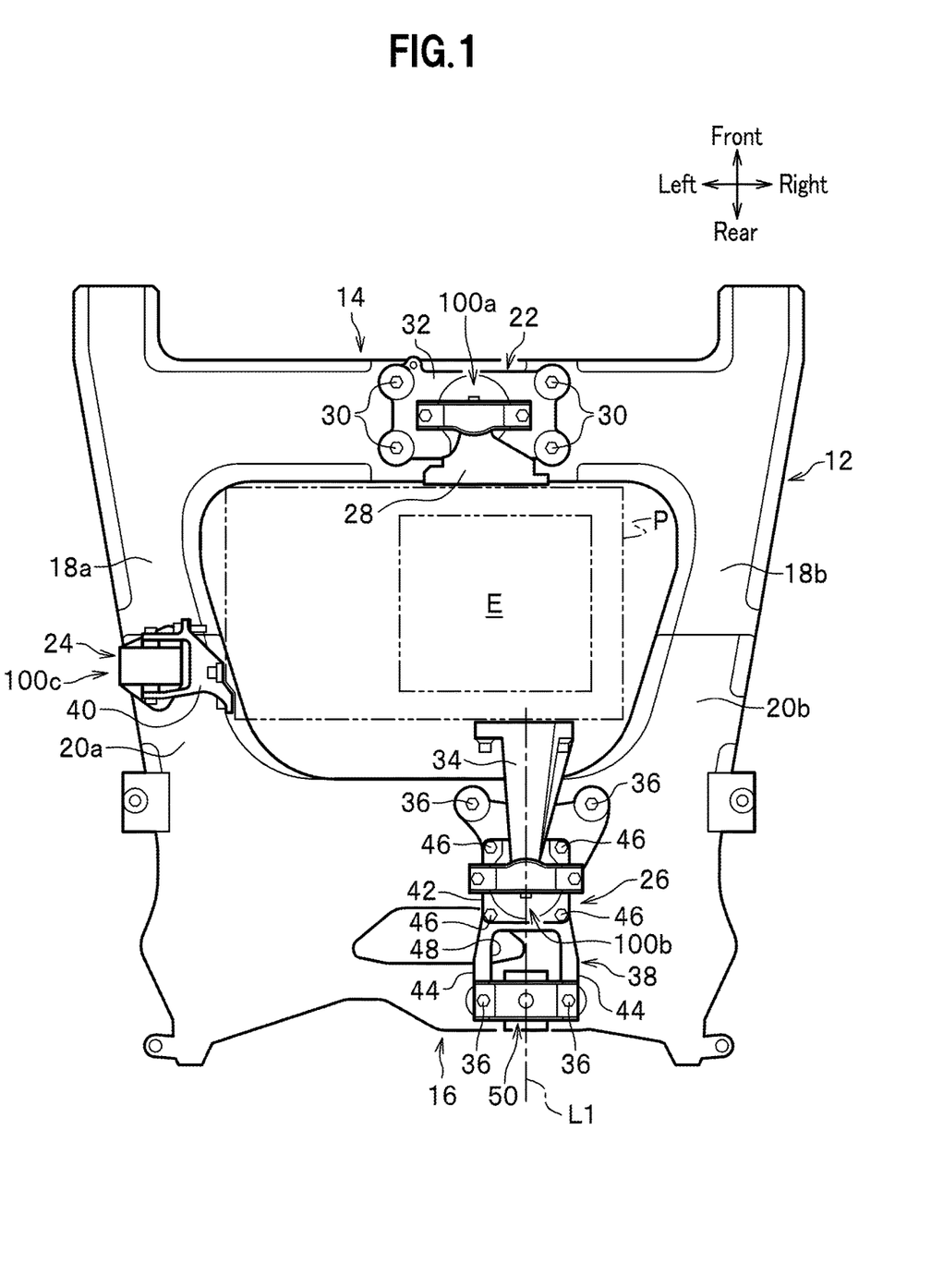
FIG. 1 is a plan view of a sub-frame to which a dynamic damper mounting structure according to embodiments of the present invention is applied.

FIG. 1 is a plan view of a sub-frame to which a dynamic damper mounting structure according to the embodiments of the present invention is applied. In the drawings, "front-rear" indicates: a vehicle front-rear direction; "left-right", a vehicle left-right direction (width direction) of the vehicle; and "up-down", a vertical upper-down direction.

As shown in FIG. 1, a sub-frame (vehicle body frame) 12 is mounted on a vehicle on a front-side of the vehicle. The sub-frame 12 is configured including a front cross member 14 and a rear cross member 16. On both sides in the vehicle width direction of the front cross member 14, a front left side part 18a and a front right side 18b extending toward the rear of the vehicle are arranged opposing to each other. On both sides in the vehicle width direction of the rear cross member 16, there are a rear left side part 20a and a rear right side part 20b extending toward the rear of the vehicle and being connected to a front left side part 18a and a front right side part 18b, respectively.

In the embodiment, the front left side part 18a and the front right side part 18b are formed integrally with the front cross member 14. Further, the rear left side part 20a and the rear right side part 20b are formed integrally with the rear cross member 16. However, the present invention is not limited to this. For example, the front left side part 18a and the rear left side part 20a are formed integrally with each other as a left side member (not shown), and the front right side part 18b and the rear right side part 20b are formed integrally with each other as a right side member (not shown).

The front cross member 14 extends in the vehicle width direction and is disposed on a front side of a power unit P. The rear cross member 16 extends in the vehicle width direction and is disposed on a rear side of the power unit P. The front left side part 18a and the rear left side part 20a extend in the front-rear direction in the plan view and disposed on a left side of the power unit P. The front right side part 18*b* and the rear right side part 20*b* extend in the front-rear direction in the plan view and disposed on a right side of the power unit P.

The sub-frame 12 is formed in parallel crosses in which the front cross member 14, the rear cross member 16, the front left side part 18*a*, the front right side part 18*b*, the rear left side part 20*a*, and the rear right side part 20*b* are integrally connected by, for example, welding. However, the present invention is not limited to the parallel crosses structure for the sub-frame 12, but may be formed with a single cross member.

The power unit P includes, for example, an engine E (drive power source as a vibration generating source) and a transmission are formed in an integral unit, and the unit is supported by the sub-frame 12 in a floating state. A floating mechanism for supporting the engine E in the floating state is disposed on the sub-frame 12. The floating mechanism includes a front mount 22 disposed on the front cross member 14, a side mount 24 disposed on the rear left side part 20*a* of the rear cross member 16, and a rear mount 26 disposed on the rear cross member 16. The engine E is supported in the floating state at three points, i.e., the front mount 22, the side mount 24, and the rear mount 26.

On the front mount 22, an antivibration device 100*a* is disposed for supporting a vehicle front side of the engine E through a mounting metal fitting 28. The antivibration device 100*a* is fixed to a front beam of the front cross member 14 through a plurality of bolts and a front mount bracket 32 rigidly through a plurality of bolts 30 and the front mount bracket 32. An antivibration device 100*b* for supporting a vehicle rear side of the engine E is disposed on a rear mount 26 through a mounting metal fitting 34. The antivibration device 100*b* is supported by the rear cross member 16 through a plurality of bolts and a mounting bracket 38 in a floating state. Another antivibration device 100*c* for supporting a left side in the vehicle width direction of the engine E is disposed on the side mount 24 through a mounting metal fitting 40. Another antivibration device 100*c* is rigidly fixed to the rear left side part 20*a* of the rear cross member 16 through a plurality of bolts.

The antivibration device 100*a* and the antivibration device 100*b* have substantially the same configuration. The configuration of the antivibration devices will be described later in detail.

Figure 2:
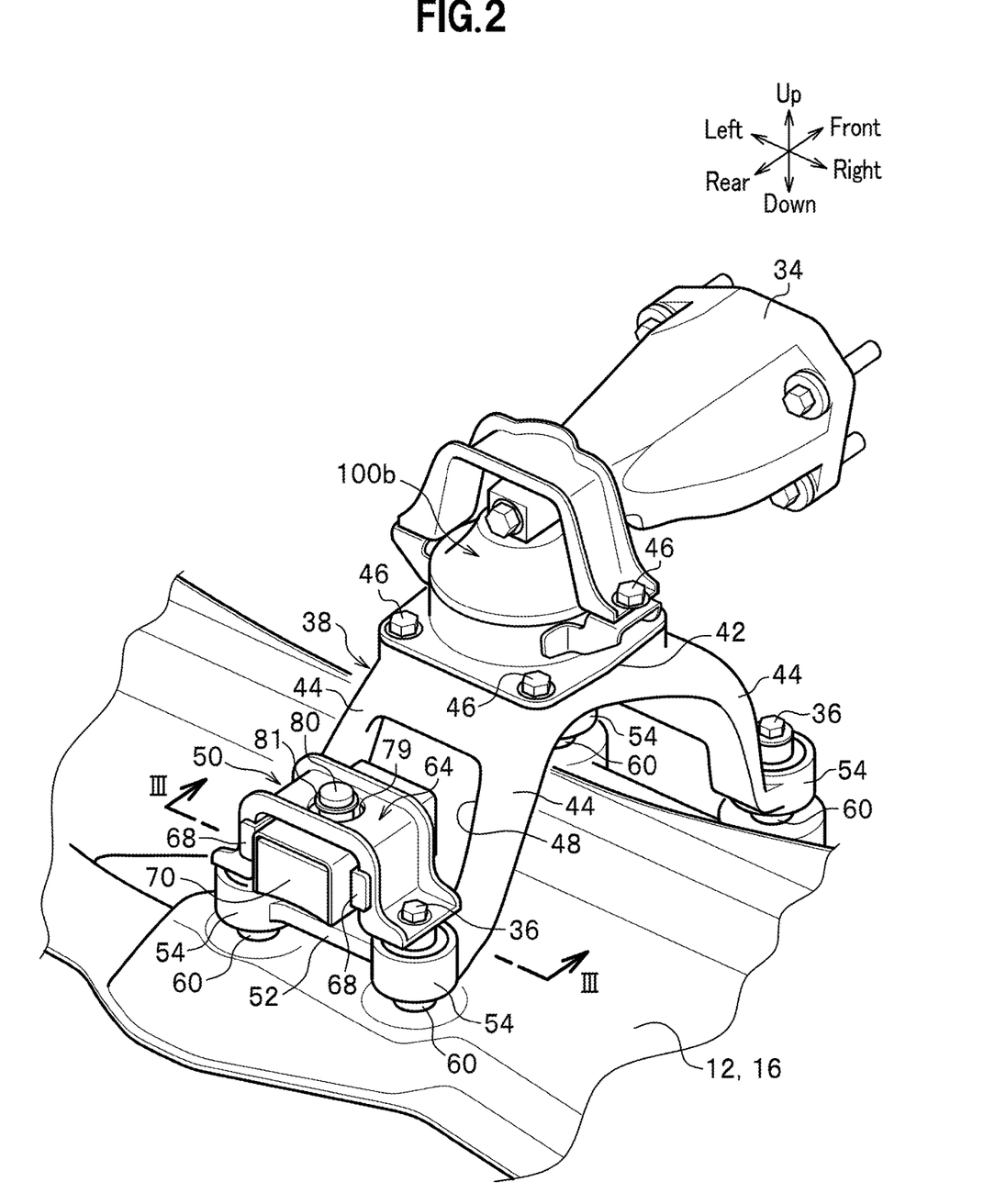
FIG. 2 is an enlarged view of an antivibration device and the dynamic damper supported by a mount bracket.
Figure 3:
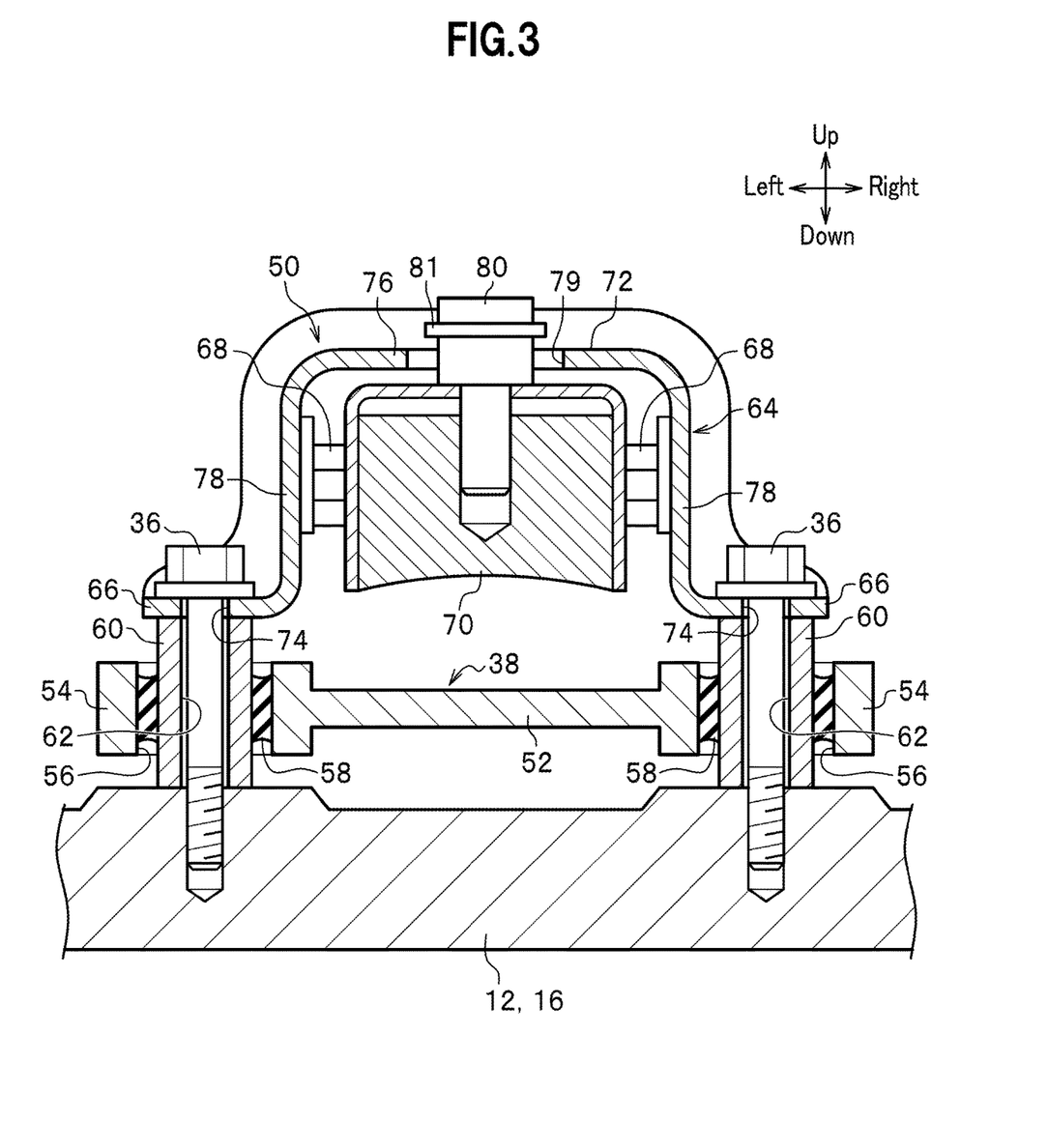
FIG. 3 is a cross section taken along line III-III shown in FIG. 2.
Figure 4:
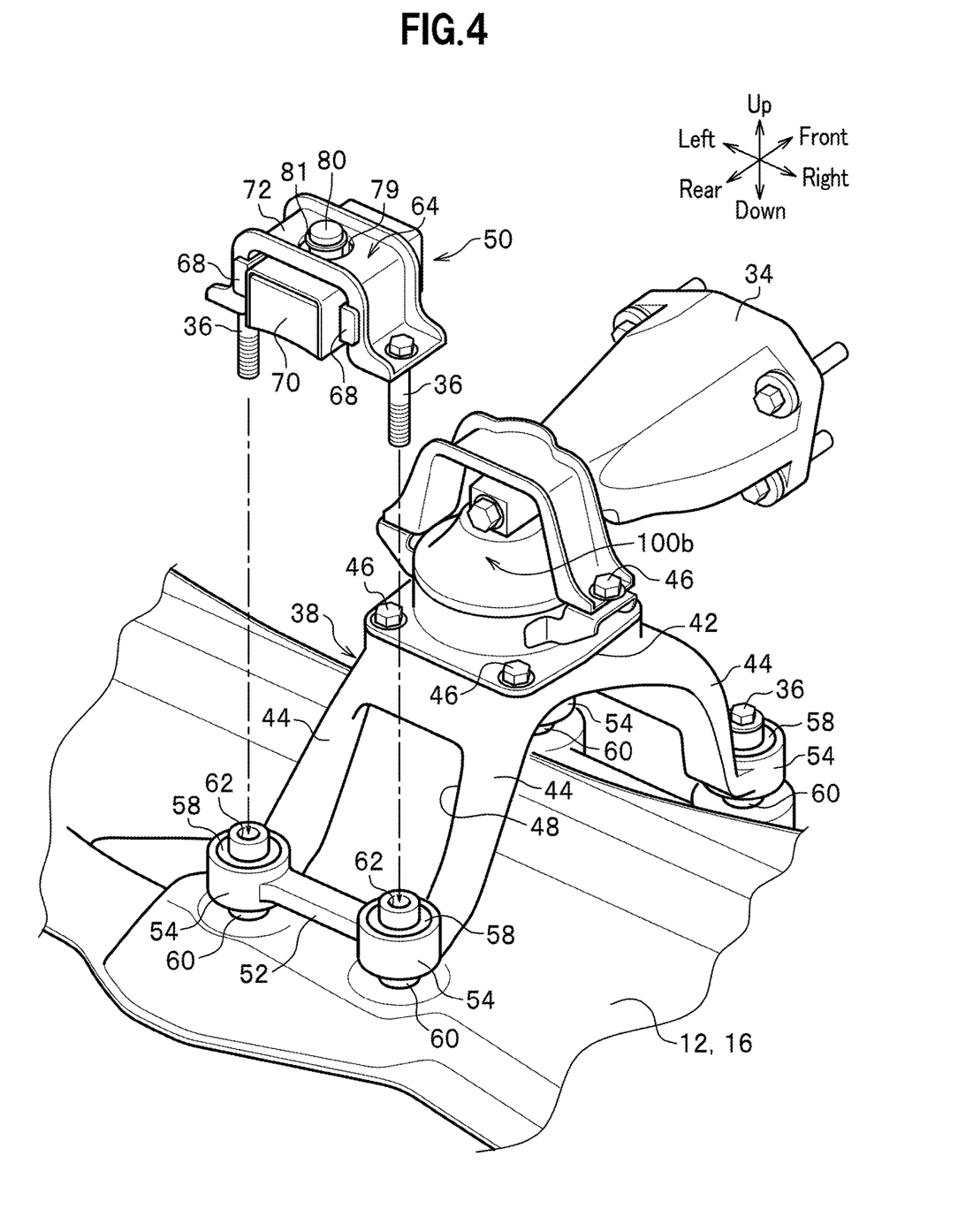
FIG. 4 is an exploded perspective view of the dynamic damper shown in FIG. 2.
Figure 5:
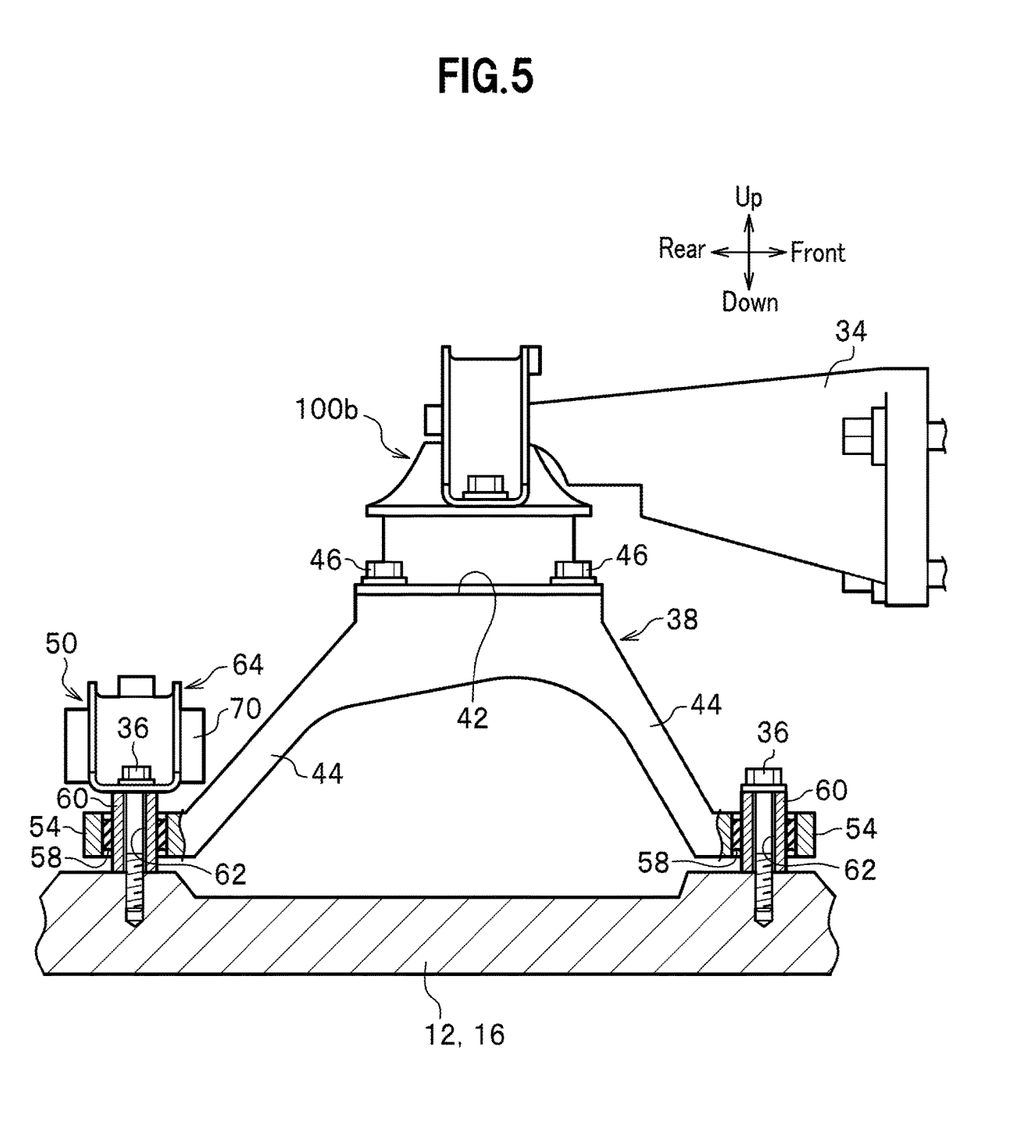
FIG. 5 is a cross section view, taken along a vehicle front-rear direction, showing a structure in which fastening is made with a blot penetrating a collar member according to the embodiment.

FIG. 2 is an enlarged view of an antivibration device and the dynamic damper supported by a mount bracket. FIG. 3 is a cross section taken along line III-III shown in FIG. 2. FIG. 4 is an exploded perspective view of the dynamic damper shown in FIG. 2. FIG. 5 is a cross section view, taken along the vehicle front-rear direction, showing a structure in which fastening is made with a bolt penetrating a collar member according to the embodiment.

As shown in FIGS. 2, 4, and 5, the antivibration device 100*b* on the rear side is supported by the mounting bracket 38. The mounting bracket 38 includes a supporting and fixing member 42, and a plurality of legs 44. The supporting and fixing member 42 has a mounting surface on an upper surface thereof on which the antivibration device 100*b* is mounted. The antivibration device 100*b* is supported and fixed on the mounting surface. The legs 44 are continuous from the supporting and fixing member 42 extend downward and are fixed to the upper surface of the rear cross member 16.

Between a pair of legs 44 positioned at a rearward of the vehicle, an opening 48 opens in a substantially rectangular shape when viewed from the rear of the vehicle. The opening 48 is positioned between a dynamic damper 50 described later and the antivibration device 100*b*. The dynamic damper 50 described later is disposed at a position where the dynamic damper 50 overlaps with the opening 48 in the vehicle front-rear direction (see FIG. 1) in a plan view. Further, a connecting member 52 is disposed between a pair of the legs 44 disposed in the vehicle front-rear direction for connecting lower ends of the pair of the legs 44.

As shown in FIG. 2, the legs 44 include at lower ends four ring bodies 54, respectively.

As shown in FIG. 3, each of the ring bodies 54 includes a through hole 56 penetrating the ring body in a vertical direction. An elastic bush 58 having a ring shape is attached (for example, by cure adhesion) in the through hole 56 to provide a floating function. A collar member 60 having a cylindrical tubular shape is attached on an inner diametric side of the elastic bush 58 so as to penetrate the elastic bush 58.

More specifically, an outer diametrical side of the elastic bush 58 is cure-adhered and an inner diametrical side of the elastic bush 58 is cure-adhered to an outer circumferential surface of the collar member 60. The mounting bracket 38 is mounted above the sub-frame 12 and elastically connected to the collar member 60 through the elastic bush 58 in a floating state. Each of the four ring bodies 54 has this floating structure.

As shown in FIG. 3, the collar member 60 includes a through hole 62 extending along an axial direction thereof allowing a bolt 36 to penetrate the through hole 62. Ends in the axial direction of the collar member 60 protrude from an upper surface and a lower surface of the ring body 54 and are exposed externally. A mounting part 66 of a dynamic damper bracket 64 described later abuts the collar member 60 at an upper end of the collar member 60 and fastened to the collar member 60 with the bolt 36. The collar member 60 is rigidly fixed to the sub-frame 12 with the bolt 36 (rigid connection).

The dynamic damper bracket 64 is fastened to the sub-frame 12 through the collar member 60 with the bolt 36. Accordingly, the bolt 36 functions as a fastening member to fasten the dynamic damper bracket 64 and the collar member 60 rigidly (rigid connection, rigid fastening) to the sub-frame 12.

As shown in FIGS. 1, 2, and 5, the dynamic damper 50 is disposed behind the antivibration device 100*b* on the rear side. The dynamic damper 50 and the anti-vibration device 100 are arranged in line along line L1 in the vehicle front-rear direction in a plan view (see FIG. 1). The dynamic damper 50 is disposed between the antivibration device 100*b* and the sub-frame 12.

As shown in FIG. 3, the dynamic damper 50 is configured including the dynamic damper bracket 64, an elastically connecting member 68, and a weight 70.

The dynamic damper bracket 64 is a press formed member which is formed by press-forming a flat strip member including a protruding part 72 having a partial rectangular shape of which middle part protrudes upward in cross-sectional view and a pair of the mounting parts 66 which are continuous from both sides of the protruding part 72 and extend in the vehicle left-right direction. A mounting through hole 74 is formed in each of the mounting parts 66 to allow the bolt 36 to penetrate therethrough. The dynamic damper bracket 64 connects the dynamic damper 50 to the sub-frame 12.

The protruding part 72 includes an upper wall 76 and a pair of side walls 78 formed on both side of the upper wall 76, being bent substantially right-angled. A pair of the side walls 78 are disposed oppositely each other through a space.

The weight 70 having a substantially rectangular parallelepiped shape is disposed in the space. A bolt member 80 protruding from a through hole 79 formed in the upper wall 76 is connected to an upper part of the weight 70. Each of the elastically connecting members 68 made of rubber is intervened at a gap between a pair of the side walls 78 and elastically connects the side wall 78 to the weight 70. The bolt member 80 is inserted loosely in the through hole 79 with clearance and disposed as a failsafe member to prevent the weight 70 from dropping from the dynamic damper bracket 64. A head of the bolt member 80 is inserted and fitted into washer 81.

The dynamic damper 50 reduces vibrations of a vibration generating source (the engine E) by a spring force of the elastically connecting member 68 and a mass of the weight 70 through cancellation. In the dynamic damper 50, a spring constant of the elastically connecting member 68 and the mass of the weight 70 are determined in accordance with a frequency of the vibrations of the vibration generating source (the engine E).

Next, a configuration and an operation of the antivibration device 100b (100a) are described below.

Figure 6:
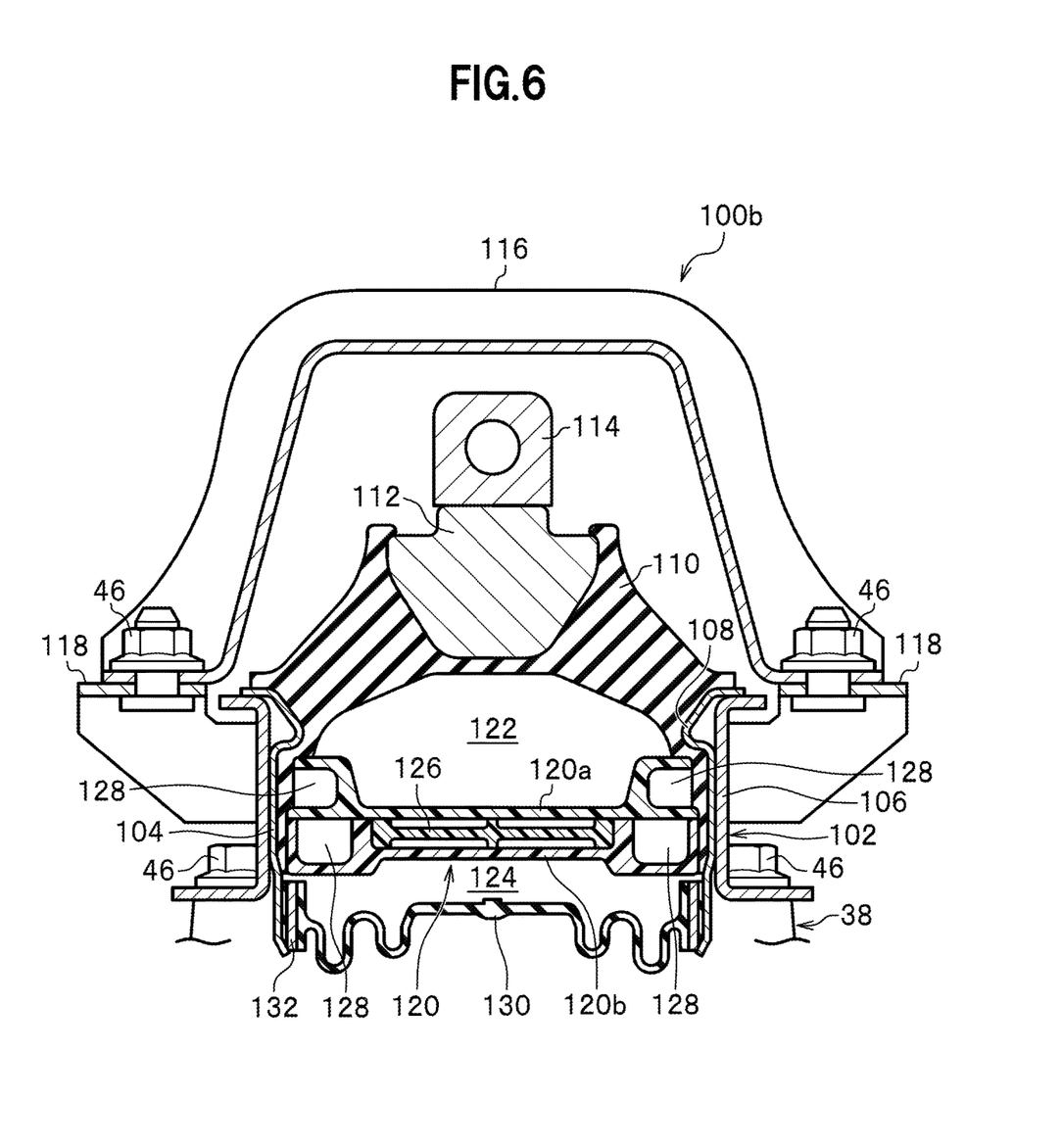
FIG. 6 is an enlarged cross section of the antivibration device.

FIG. 6 is an enlarged cross section of the antivibration device. Since the antivibration device 100a and the antivibration device 100b have substantially the same configuration, only configuration of the antivibration device 100b is described in detail below and the description of the antivibration device 100a is omitted. As the antivibration device 100b shown in FIG. 6, a liquid seal type is used. However, the present invention is not limited to this.

As shown in FIG. 6, the antivibration device 100b is configured including a lower bracket 102 and a housing 104. The lower bracket 102 is fixed to the mounting bracket 38 (the sub-frame 12) through a bolt 46. The housing 104 is pressure-fit into a through hole of a cylindrical tubular part 106 into a center part of the lower bracket 102. The antivibration device 100b is intervened between the sub-frame 12 and the engine E (vibration generating source) to suppress vibrations transmitted from the engine E to the sub-frame 12.

An elastic member 110 is adhered to the housing 104 through a ring shape protrusion 108. An upper bracket 112 is disposed by adhesion to an upper part of the elastic member 110. On the upper bracket 112, a mounting part 114 extending upward is disposed to be fixed to the mounting metal fitting 34 (see FIGS. 2 and 4). Further, an arm part 116 having an arc shape and being bridged over the elastic member 110 in the vehicle width direction is provided above the mounting part 114. The arm part 116 is fastened to a pair of left and right mounting parts 118 with the bolts 46.

The elastic member 110 includes a space thereinside. The space is sectioned into a main liquid chamber (pressure receiving chamber) 122 on an upper side and a sub-liquid chamber (balance chamber) 124 on the lower side by a sectioning member 120.

The sectioning member 120 is configured including an upper sectioning member 120a and a lower sectioning member 120b. A membrane (movable partition) 126 is intervened between the upper sectioning member 120a and the lower sectioning member 120b. Further, orifice passages 128 for communication are provided on an outer diametrical side between a main liquid chamber 122 and the sub-liquid chamber 124.

A diaphragm 130 is provided below the sectioning member 120 to form the sub-liquid chamber 124. A ring member 132 is provided to the diaphragm 130 being vulcanized-adhered to an inside of an outer circumferential part of the diaphragm 130. A lower part of the housing 104 is crimped to support the ring member 132, so that the diaphragm 130 is fixed to the housing 104.

Fluid having a viscosity (non-compressive fluid) is sealed into the main liquid chamber 122, the sub-liquid chamber 124, and the orifice passage 128. The sealed fluid flows between the main liquid chamber 122 and the sub-liquid chamber 124 through the orifice passage 128, when a load (force) is applied to the antivibration device 100b. The flow of the fluid reduces the input load.

The sub-frame 12 to which the mounting structure of the dynamic damper according to the present embodiment is applied is basically configured as described above, and an operation and advantageous effect are described below.

Figure 7A:
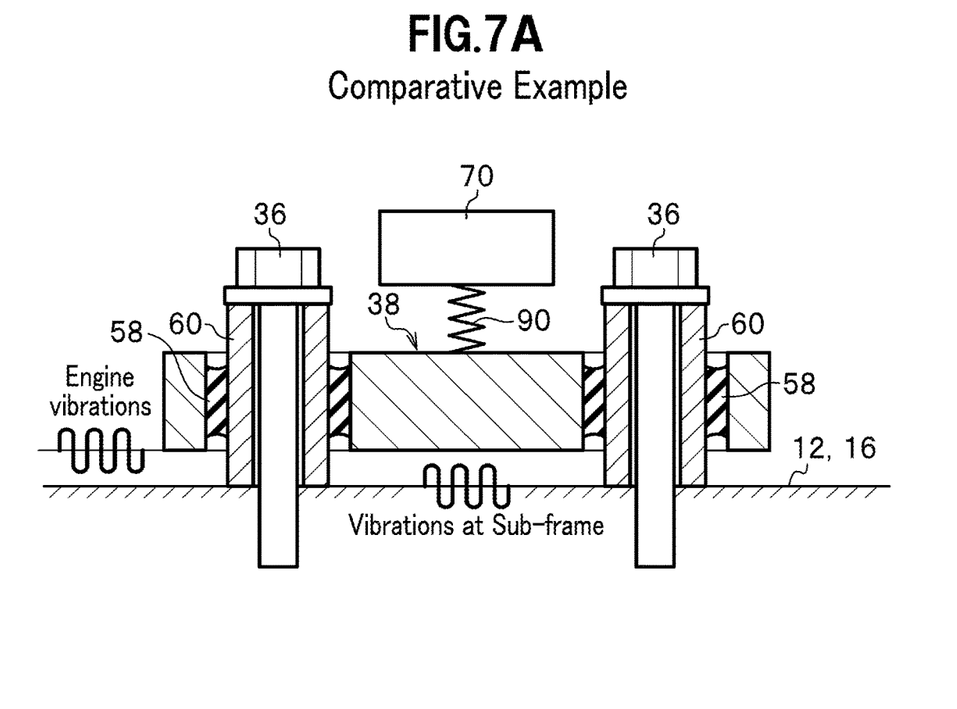
FIG. 7A is a schematic view of a dynamic damper considered by the inventor.

FIG. 7A is a schematic view of a dynamic damper of a comparative example considered by the inventor for comparison.

In the comparative example, the same or corresponding components are designated with the same reference numerals as those of the present embodiment.

As shown in FIG. 7A, in the comparative example, the weight 70 (mass) is directly connected to the mounting bracket 38 through an elastomer 90. In the comparative example, because vibrations generated by the engine E are transmitted to the sub-frame 12, there may be a possibility that vibrations of the elastic bush 58 of the mounting bracket 38 interfere vibrations of the weight 70 of the dynamic damper 50. Accordingly, unstable vibrations may be generated by the dynamic damper 50. This may interfere the vibration reducing function, so that a sufficient vibration reducing function cannot be displayed by the dynamic damper 50.

Figure 7B:
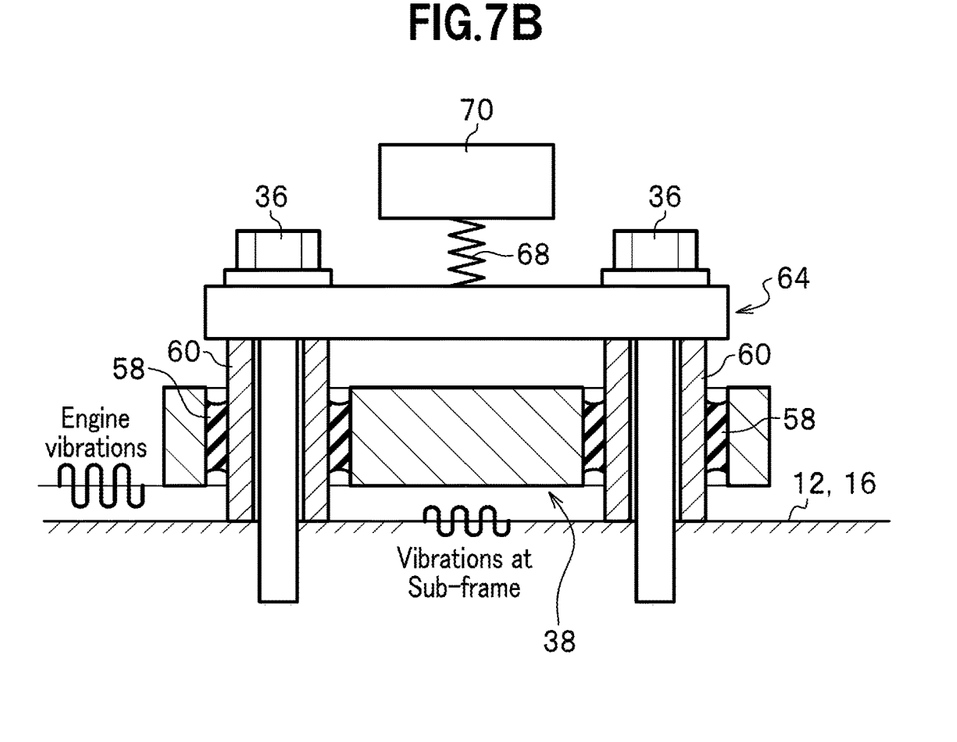
FIG. 7B is a schematic drawing of a dynamic damper according to the embodiment of the present invention.

Contrary to this, according to the embodiment, as shown in FIG. 7B, both the dynamic damper bracket 64 and the collar member 60 are rigidly fixed with the bolt 36 for rigid connection (rigid fastening). Similarly, the mounting bracket 38 is elastically connected to the collar member 60 through the elastic bush 58.

Accordingly, in the present embodiment, when the vibrations generated by the engine E are transmitted to the sub-frame 12, vibrations transmitted from the mounting bracket 38 to the sub-frame 12 are reduced by the elastic bush 58 and vibrations of the dynamic damper 50 (the weight 70) are directly transmitted to the sub-frame 12 through the collar member 60 and the bolt 36. This structure can avoid interference between vibrations by the elastic bush 58 of the mounting bracket 38 and vibrations of the weight 70 of the dynamic damper 50, which can suppress occurrence of the unstable variations of the dynamic damper 50. As a result, the vibrations of the sub-frame 12 can be reduced. Further, this provides optimization and labor saving in mounting space of the dynamic damper 50 to the sub-frame 12.

Further, in the present embodiment, the dynamic damper bracket 64 and the collar member 60 elastically connected to the mounting bracket 38 are fastened to the sub-frame 12 together by the bolt 36 penetrating the collar member 60. This can enhance stiffness and strength of members between the dynamic damper bracket 64 and the sub-frame 12 in an axial direction of the bolt 36 (the collar member 60).

In addition, the dynamic damper 50 is disposed between the antivibration device 100b and the sub-frame 12. This provides attenuation of the input (vibrations) from the power unit P which is transmitted to a side of the sub-frame 12 by making small a distance between the dynamic damper 50 and the sub-frame 12 than a distance between the antivibration device 100b and the sub-frame 12. Further, this provides a preferable transmission of the dynamic damper 50 to the sub-frame 12 because the dynamic damper bracket 64 is rigidly fixed to the sub-frame 12 through the collar member 60 in the present embodiment. Accordingly, the vibrations transmitted to the sub-frame 12 can be preferably suppressed by cancelling the vibrations transmitted to the sub-frame 12.

In addition the mounting bracket 38 includes the opening 48, having the substantially rectangular shape, which is disposed between the dynamic damper 50 and the antivibration device 100b. The dynamic damper 50 is disposed at a position overlapping the opening 48 in the vehicle front-rear direction. This provides external radiation of the heat generated by the vibrations of the dynamic damper 50 through the space of the opening 48. As a result, according to the present embodiment, it can be provided to suppress staying of the heat generated at the dynamic damper 50 between the dynamic damper 50 and the mounting bracket 38.

Further, the dynamic damper 50 and the antivibration device 100b are arranged in line on a line L1 in the vehicle front-rear direction in a plan view. According to the present embodiment, this can more suppress input of specific vibrations to the mounting bracket 38 than a case where the dynamic damper 50 and the antivibration device 100b are arranged not in line, but vibration transmission directions of the dynamic damper 50 and the antivibration device 10b have an offset in the Left-right direction. This is because input of specific vibrations to the mount bracket 38 due to interference between the vibrations by the dynamic damper 50 and the vibrations by the antivibration device 100b, can be suppressed.

Further, according to the present embodiment, both the dynamic damper 50 and the antivibration device 100b are disposed, which provides a double vibration suppression structure to the sub-frame 12.

Figure 8:
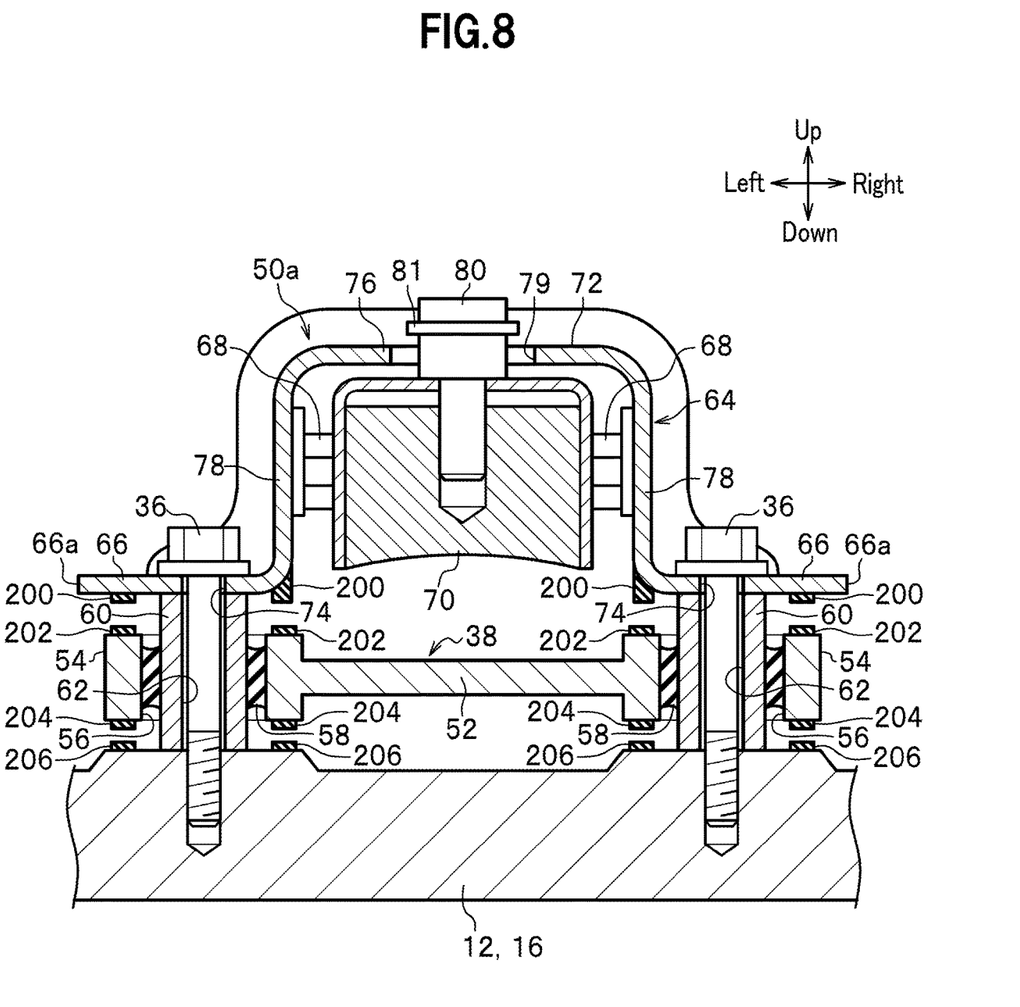
FIG. 8 is a cross section view showing a modification of the dynamic damper corresponding to FIG. 3.
Figure 9:
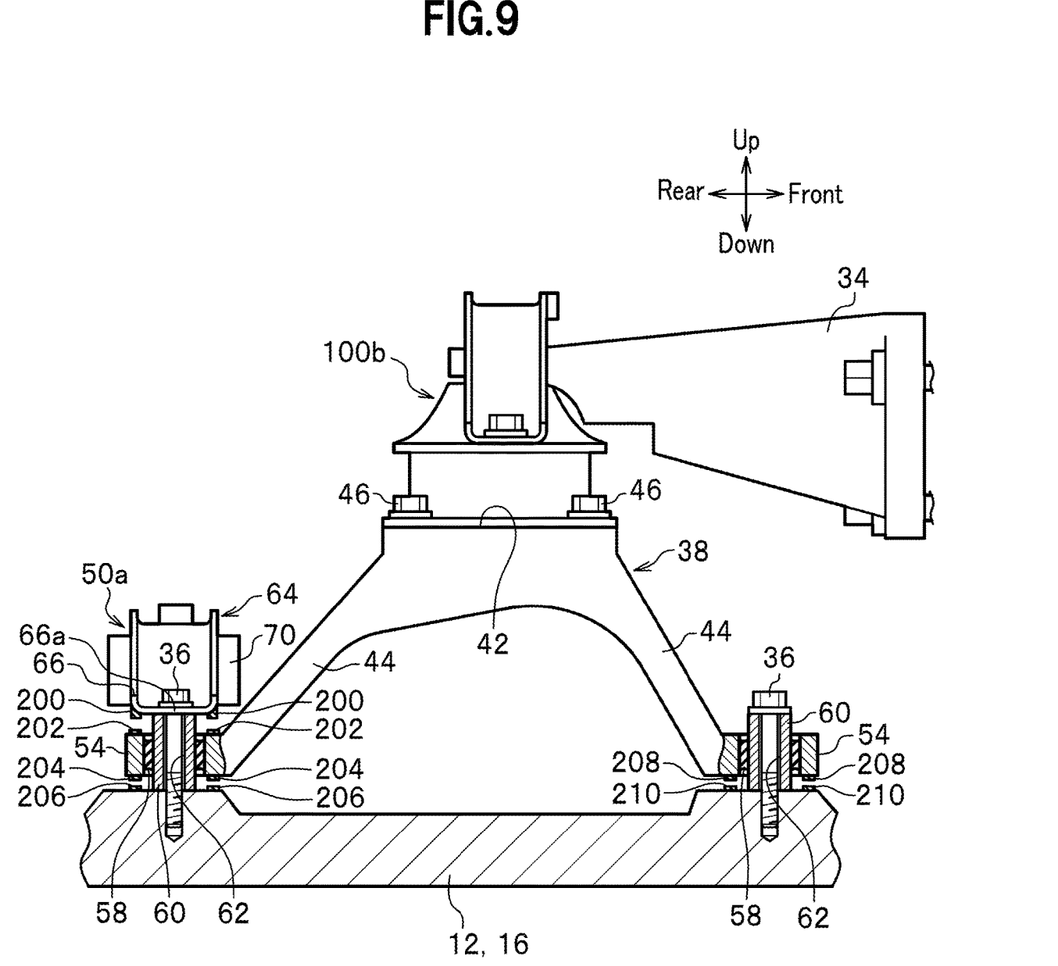
FIG. 9 is a cross section view, taken along the vehicle front-rear direction, of a damper mounting structure including the dynamic damper shown in FIG. 8.
Figure 10A:
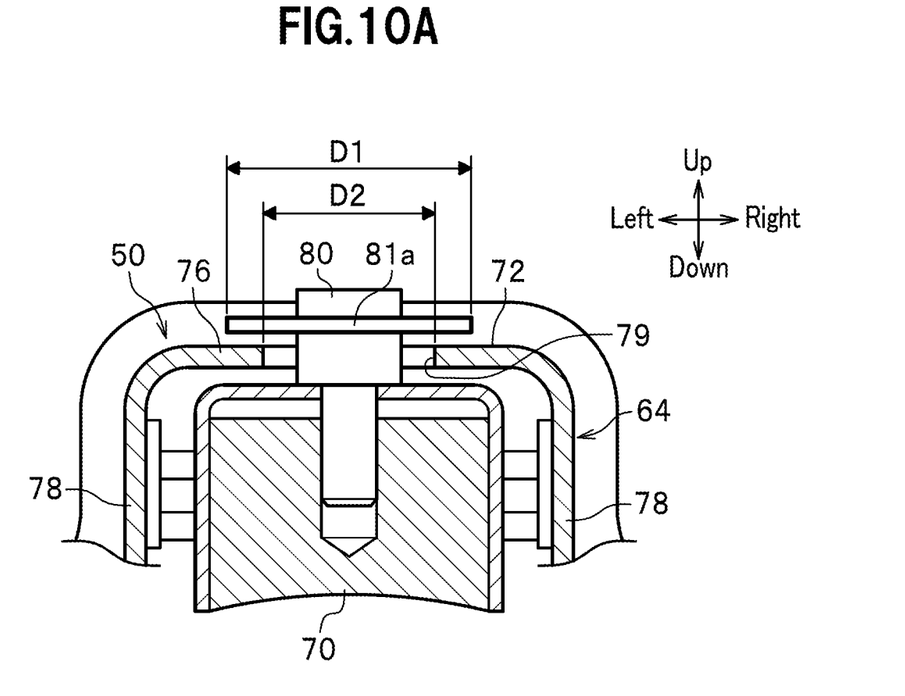
FIGS. 10A and 10B are cross section views showing modifications of a failsafe member, respectively.
Figure 10B:
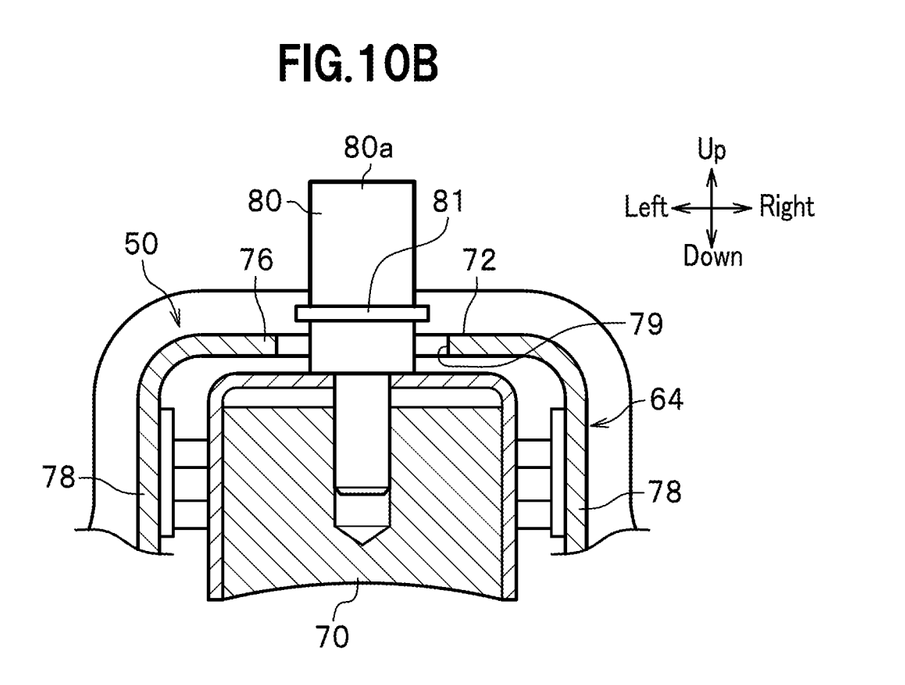

Next, modifications according to the present embodiment are shown in FIGS. 8 to 10.

FIG. 8 is a cross section view showing a modification of the dynamic damper corresponding to FIG. 3. FIG. 9 is a cross section view, taken along the vehicle front-rear direction, of a damper mounting structure including the dynamic damper shown in FIG. 8. FIGS. 10A and 10B are cross section views showing modifications of a failsafe member, respectively.

As shown in FIG. 8, a dynamic damper 50a according to the modification differs from the embodiment shown in FIG. 3 in that end portions 66a of the mounting part 66 of the dynamic damper bracket 64 are extended in the left-right direction, respectively. An elastic member 200 is adhered to a lower surface of each of the mounting parts 66. Further, elastic members 202 and 204 are adhered to upper end surface and a lower end surface of the ring bodies 54 of the legs 44 (see FIGS. 2 and 4), respectively. In addition, elastic members 206 are adhered to an upper surface of the sub-frame 12 at positions corresponding to the lower end surface of the ring bodies 54 (positions corresponding to lower surfaces of the ring bodies 54).

In the modification shown in FIG. 9, an elastic member 208 is adhered to the lower surface of the ring body 54 at a position corresponding to a lower end surface of the ring body 54 above the sub-frame 12. These elastic members 200, 202, 204, 206, 208, 210 are formed with ring-bodies encircling outer circumferential surface of the collar member 60 at positions overlapping in the vertical direction.

In the modifications, the elastic members facing each other are allowed to abut each other, which reduces noises generated by collision vibration between the ring body 54 and the sub-frame 12.

In the modification of the failsafe members shown in FIG. 10A, an outer diameter (D1) of the washer 81a is greater than an inner diameter (D2) of the through hole 79 (D1>D2). This prevents the dynamic damper bracket 64 from dropping from the dynamic damper bracket 64. In the modification in the failsafe member shown in FIG. 10B, a head 80a is elongated. This can avoid dropping off of the head 80a of the bolt member 80 from the through hole 79. The failsafe function can be efficiently provided with such a simple structure.

The invention claimed is:

1. A mounting structure for mounting a dynamic damper on a vehicle body frame of a vehicle, comprising:
    a dynamic damper bracket connecting the dynamic damper to the vehicle body frame;
    a collar member rigidly fixed to the vehicle body frame;
    a mounting bracket which is mounted above the vehicle body frame, and which is connected to the collar member through an elastic bush; and
    a fixing member which fixes the dynamic damper bracket and the collar member to the vehicle body frame,
    wherein an end of the collar member is on the vehicle body frame and the dynamic damper bracket is on an opposite end of the collar member.

2. The mounting structure as claimed in claim 1, wherein the fixing member comprises a bolt penetrating the collar member having a cylindrical tubular shape; and
    wherein both the dynamic damper bracket and the collar member are fastened by the bolt penetrating the collar member to the vehicle body frame.

3. The mounting structure as claimed in claim 1,
    wherein the mounting bracket is connected to an anti-vibration device;
    wherein the anti-vibration device is connected to a power source which is a vibration generation source; and
    wherein the dynamic damper is disposed between the anti-vibration device and the vehicle body frame.

4. The mounting structure as claimed in claim 3, wherein the mounting bracket has an opening positioned between the dynamic damper and the anti-vibration device; and
    wherein the dynamic damper is disposed at a position where the dynamic damper overlaps the opening.

5. The mounting structure as claimed in claim 4, wherein the dynamic damper and the anti-vibration device are arranged in line in a front-rear direction of the vehicle.

6. The mounting structure as claimed in claim 1, wherein
    the mounting bracket is coupled to a source of vibrations and transmits the vibrations to the vehicle body frame through the elastic bush and to the dynamic damper through the elastic bush and the dynamic damper bracket, and
    the dynamic damper generates in response to the vibrations from the mounting bracket a cancellation force at the vehicle body frame to cancel the vibrations from the mounting bracket.

7. A mounting structure for mounting a dynamic damper on a vehicle body frame of a vehicle, comprising:
    a dynamic damper bracket connecting the dynamic damper to the vehicle body frame;
    a collar member rigidly fixed to the vehicle body frame;
    a mounting bracket which is mounted above the vehicle body frame, and which is elastically connected to the collar member; and a fixing member which fixes the dynamic damper bracket and the collar member to the vehicle body frame, wherein the fixing member comprises a bolt penetrating the collar member having a cylindrical tubular shape, and wherein both the dynamic damper bracket and the collar member are fastened by the bolt penetrating the collar member to the vehicle body frame.

8. A mounting structure for mounting a dynamic damper on a vehicle body frame of a vehicle, comprising:

a dynamic damper bracket connecting the dynamic damper to the vehicle body frame;

a collar member rigidly fixed to the vehicle body frame;

a mounting bracket which is mounted above the vehicle body frame, and which is elastically connected to the collar member; and a fixing member which fixes the dynamic damper bracket and the collar member to the vehicle body frame, wherein the mounting bracket is connected to an anti-vibration device, wherein the anti-vibration device is connected to a power source which is a vibration generation source, wherein the dynamic damper is disposed between the anti-vibration device and the vehicle body frame, wherein the mounting bracket has an opening positioned between the dynamic damper and the anti-vibration device, wherein the dynamic damper is disposed at a position where the dynamic damper overlaps the opening, and wherein the dynamic damper and the anti-vibration device are arranged in line in a front-rear direction of the vehicle.

* * * * *